United States Patent [19]

Flora

[11] Patent Number: 4,472,772
[45] Date of Patent: Sep. 18, 1984

[54] HIGH SPEED MICROINSTRUCTION EXECUTION APPARATUS

[75] Inventor: Laurence P. Flora, Covina, Calif.

[73] Assignee: Burroughs Corporation, Detroit, Mich.

[21] Appl. No.: 289,644

[22] Filed: Aug. 3, 1981

[51] Int. Cl.³ .......................... G06F 9/12; G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,820,078 | 6/1974 | Curley et al. | 364/200 |
| 3,886,523 | 5/1975 | Ferguson et al. | 364/200 |
| 4,038,643 | 7/1977 | Kim | 364/200 |
| 4,099,253 | 7/1978 | Dooley, Jr. | 364/900 |
| 4,104,719 | 8/1978 | Chu et al. | 364/200 |
| 4,118,773 | 10/1978 | Raguin et al. | 364/200 |
| 4,124,893 | 11/1978 | Joyce et al. | 364/200 |
| 4,155,120 | 5/1979 | Keefer et al. | 364/200 |
| 4,156,290 | 5/1979 | Lanza | 364/200 |
| 4,202,035 | 5/1980 | Lane | 364/200 |
| 4,224,668 | 9/1980 | Peters et al. | 364/200 |

Primary Examiner—Gareth D. Shaw
Assistant Examiner—Daniel K. Dorsey
Attorney, Agent, or Firm—Nathan Cass; Kevin R. Peterson; David G. Rasmussen

[57] ABSTRACT

N-way microprogram branching is employed in conjunction with a specially organized multiple-chip microinstruction memory in a manner which makes it possible to divide the accessing of the memory into two separate operations which can be performed simultaneously and in parallel, thereby significantly reducing the time required for accessing the memory.

11 Claims, 4 Drawing Figures

HIGH SPEED MICROINSTRUCTION EXECUTION APPARATUS

INTRODUCTION

The present invention relates generally to improved apparatus and methods for controlling the operation of digital data processors.

More particularly, the present invention is directed to improved apparatus and methods for controlling the sequencing and branching of microinstructions in a microprogrammed digital data processor in a manner so as to significantly increase the speed of microinstruction execution.

BACKGROUND OF THE INVENTION

A particular architectural concept that has allowed for more flexibility in computer design and also in computer programming has been the concept of microinstructions. Initially, a microinstruction was thought of as merely a set of control bits employed within a macroinstruction format. Such control bits were, for example, employed to provide a corrective measure during the execution of a multiplying instruction or shift instruction and the like. Gradually, as the microprogramming concept enlarged, the macroinstruction specified the particular routine to be performed, such as the addition of two operands. The execution of the macroinstruction was then accomplished through a sequence of executions of microinstructions, each of which specified the particular gates to be set thereby. Since a plurality of macroinstructions could be implemented by a finite set of microinstructions, it was then apparent that these same microinstructions could be stored in a separate storage to be addressed in a particular sequence upon the execution of different macroinstructions. It was further recognized that various sequences of microinstructions could be formulated to carry out the particular operations and separately stored in any memory. Thus, a great variety of sequences of microinstructions could be created to carry out a great variety of routines.

The concept of microinstructions or microprograms, then, became one of providing sub-instructional sets which were masked or hidden from the programmer, thereby simplifying the writing of particular programs by minimizing the number of individual specific steps that had to be called for by the programmer.

Microprogramming may thus be broadly viewed as a technique for designing and implementing the control function of a digital computer system as sequences of control signals that are organized on a word basis and stored in a fixed or dynamically changeable control memory. Detailed examples of some known approaches to the design of microprogrammed digital computers can be found in U.S. Pat. No. 3,886,523, Ferguson et al., issued May 27, 1975, U.S. Pat. No. 4,155,120, Keefer and Kim, issued May 15, 1979, U.S. Pat. No. 4,181,935, Feeser and Gerhold, issued Jan. 1, 1980 and U.S. Pat. No. 4,038,643, Kim, issued July 26, 1977; in the book by S. S. Husson, "Microprogramming: Principles and Practices", Prentice-Hall, Inc. (1970); in the book "Foundations of Microprogramming", Argrausala, et al., Academic Press, Inc., 1976; in the article "Microprogramming-Another Look at Internal Computer Control", M. J. Flynn, I.E.E.E. Proc., Vol. 63, No. 11, November 1975, pp. 1554–1567; and in the article "Microprogramming: A Tutorial and Survey of Recent Developments", I.E.E.E. Transactions on Computers, Vol. C-29, No. 1, January 1980.

The contents and teachings of the above references are to be regarded as incorporated herein.

As will be apparent from the referenced Husson book, a prior art microprogram control memory may typically comprise a selectively addressable control memory having microinstruction control words stored at selectable addressable locations thereof. In order to provide for branching, each control word may typically include, in addition to the microinstruction bits, special next address bits and condition select bits which are applied to branching logic along with system condition signals to determine the address of the next microinstruction.

From a speed viewpoint, a critical operation of a microprogrammed data processor resides in the selecting and fetching of a next microinstruction from a plurality of possible next microinstructions. In typical prior art systems, the worst-case time period required for selecting and fetching the next microinstruction is the cumulative time required for (1) selecting the processor condition bits in response to the condition select bits accompanying the current microinstruction, then (2) combining these selected condition bits with the next address bits to form the address of the next microinstruction, and finally (3) using this next microinstruction address to read out the next microinstruction from the microprogram control memory. Typically, this selecting and fetching of the next microinstruction is overlapped with the execution of the current microinstruction in order to reduce their effect on overall processing speed. However, the selection and fetching time still remains as a significant limitation on overall processing speed.

SUMMARY OF THE PRESENT INVENTION

Accordingly, it is the primary object of the present invention to provide improved apparatus and methods for significantly reducing the time required for selecting and fetching a next microinstruction in a microprogrammed data processor.

It is another object of the present invention to provide improved apparatus and methods for achieving the advantages of the foregoing object in a relatively simple and economical manner.

The above objects are accomplished in a particular preferred embodiment of the invention by employing N-way microprogram branching in conjunction with a specially organized multiple-chip microinstruction memory arrangement addressed in a manner which makes it possible to divide the accessing of the memory into two separate operations which can be performed simultaneously and in parallel, thereby significantly reducing the time required for selecting and fetching the next microinstruction.

The specific nature of the invention as well as other objects, features, advantages and uses will become apparent from the following description of a preferred embodiment in conjunction with the accompanying drawings.

DESCRIPTION OF A PREFERRED EMBODIMENT

Like numerals and characters refer to like elements throughout the figures of the drawings.

Figure 1:
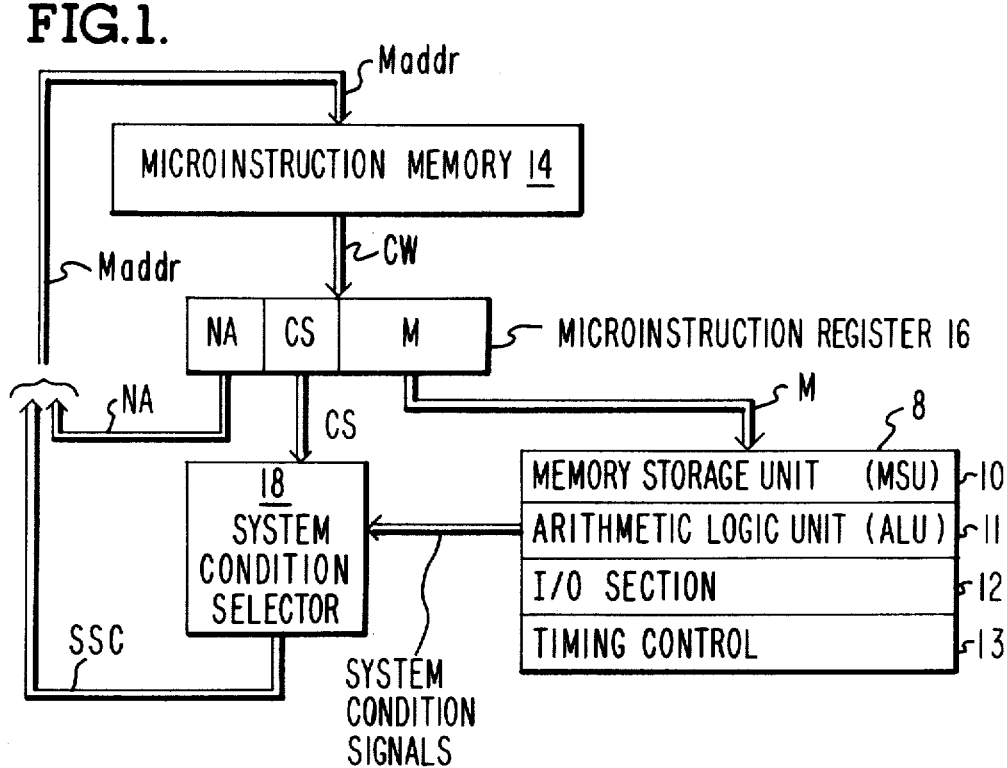
FIG. 1 is a block diagram of a microprogrammed digital data processor in which the present invention may be incorporated.

Reference is initially directed to FIG. 1 which illustrates a digital data processing system in which the present invention may be incorporated. For the sake of simplicity, block 8 in FIG. 1 is provided to represent conventional portions of a digital data processing system including a memory storage unit (MSU) 10, an arithmetic logic unit (ALU) 11, an input/output (I/O) section 12, and a timing control 13, each of which may be provided in any of a variety of forms well known in the art. The remainder of FIG. 1 illustrates the manner in which provision is made for microinstruction accessing and branching. It is to be understood that the present invention is also applicable for enhancing the speed of microinstruction execution of other types of data processing systems besides that illustrated in FIG. 1.

It will be remembered that an important feature of the present invention resides in the manner in which provision is made for selecting and fetching a next microinstruction with N-way branching so as to significantly increase the speed of microinstruction execution. However, before this feature is considered in detail with reference to FIGS. 3 and 4, it will be instructive to first describe the construction and operation of FIG. 1.

For the purposes of this description, it will be assumed that synchronous timing is provided for the system by the timing control 13 with one microinstruction being performed during each machine cycle. It will also be assumed that storage devices are set to updated values each cycle by a clock occurring at the end of each cycle. In order not to confuse the drawings, the particular timing signals fed to the various components of the system are not shown, but should be assumed to be provided in a conventional manner.

Figure 2:
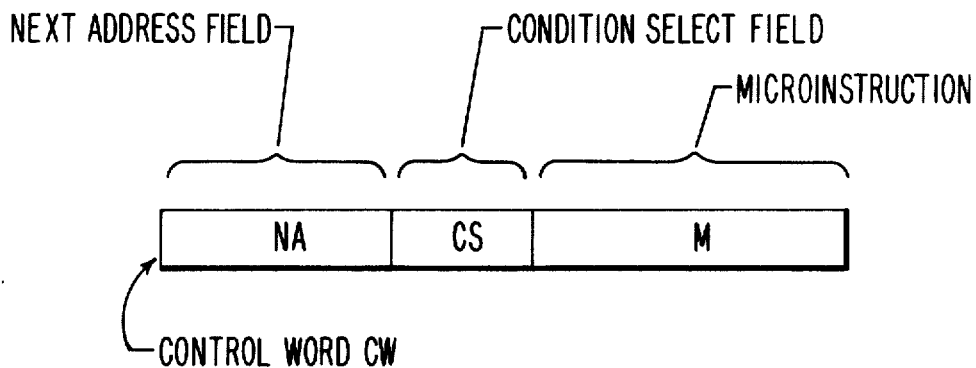
FIG. 2 illustrates the format of a control word stored in the microinstruction memory of FIG. 1.

Continuing with the overall description of FIG. 1, it will be understood that a programmable microinstruction memory 14 is provided for storing a plurality of microinstruction control words CW. A typical control word CW is illustrated in FIG. 2 and will be seen to be comprised of a microinstruction M along with a next address field NA and a condition select field CS.

During system operation, the following overlapped executing and fetching operations occur during each machine cycle using a selected control word CW accessed from the microinstruction memory 14: (1) the system executes the microinstruction M portion of the control word CW stored in a microinstruction register 16, the control word having been fetched from the microinstruction memory 14 and stored in the microinstruction memory 16 during the previous cycle, and (2) the system fetches a next microinstruction control word CW from the microinstruction memory 14 and stores it in the microinstruction register 16 for use during the next cycle, the particular microinstruction control word which is fetched being selected in response to the next address NA and condition select CS fields accompanying the current microinstruction M in the microinstruction register 16.

With regard to the microinstruction execution operation (1) above, it will be understood that the microinstruction M in the microinstruction register 16 comprises a plurality of microinstruction control signals which are applied to block 8 in FIG. 1 and operate in a conventional manner to control particular gates therein so as to perform the operations called for by the microinstruction.

With regard to the fetching operation (2) above, it will be seen in FIG. 1 that the next microinstruction control word address Maddr for the microinstruction memory 14 is derived by concatenating the next address NA field currently stored in the microinstruction register 16 with one or more selected system condition signals SSC provided by a system condition selector 18 which makes its selection in response to the condition select CS field currently stored in the microinstruction register 16. For example, the system condition selector 18 may provide for selecting three out of a much larger number of system condition signals provided by block 8 in FIG. 1. The system condition selector 18 may typically be implemented using a conventional integrated circuit multiplexor, in which case the system conditions from block 8 constitute the multiplexor inputs, the condition select CS field provides the multiplexor selection signals, and the multiplexor outputs are then the selected system conditions SSC which are concatenated with the next address NA data to form the address Maddr of the next microinstruction control word. Assuming, for example, that the number of selected system conditions SSC is three, it will be understood that an 8-way branch can thus be implemented, since three SSC signals can provide eight different values of the next address Maddr.

Having thus described how the next microinstruction control word address Maddr is derived in an N-way branching implementation, the problem still remains as to how to best employ the resulting address Maddr for fetching the corresponding microinstruction control word CW from the microinstruction memory 14 in the least possible amount of time so that the speed of microinstruction execution can be made as fast as possible. As will now be described with additional reference to FIGS. 3 and 4, the present invention provides for significantly increasing the speed of microinstruction execution by specially choosing the organization of the microinstruction memory 14 and its manner of accessing so that the time required for accessing the next microinstruction control word CW (FIG. 2) is significantly reduced.

Figure 3:
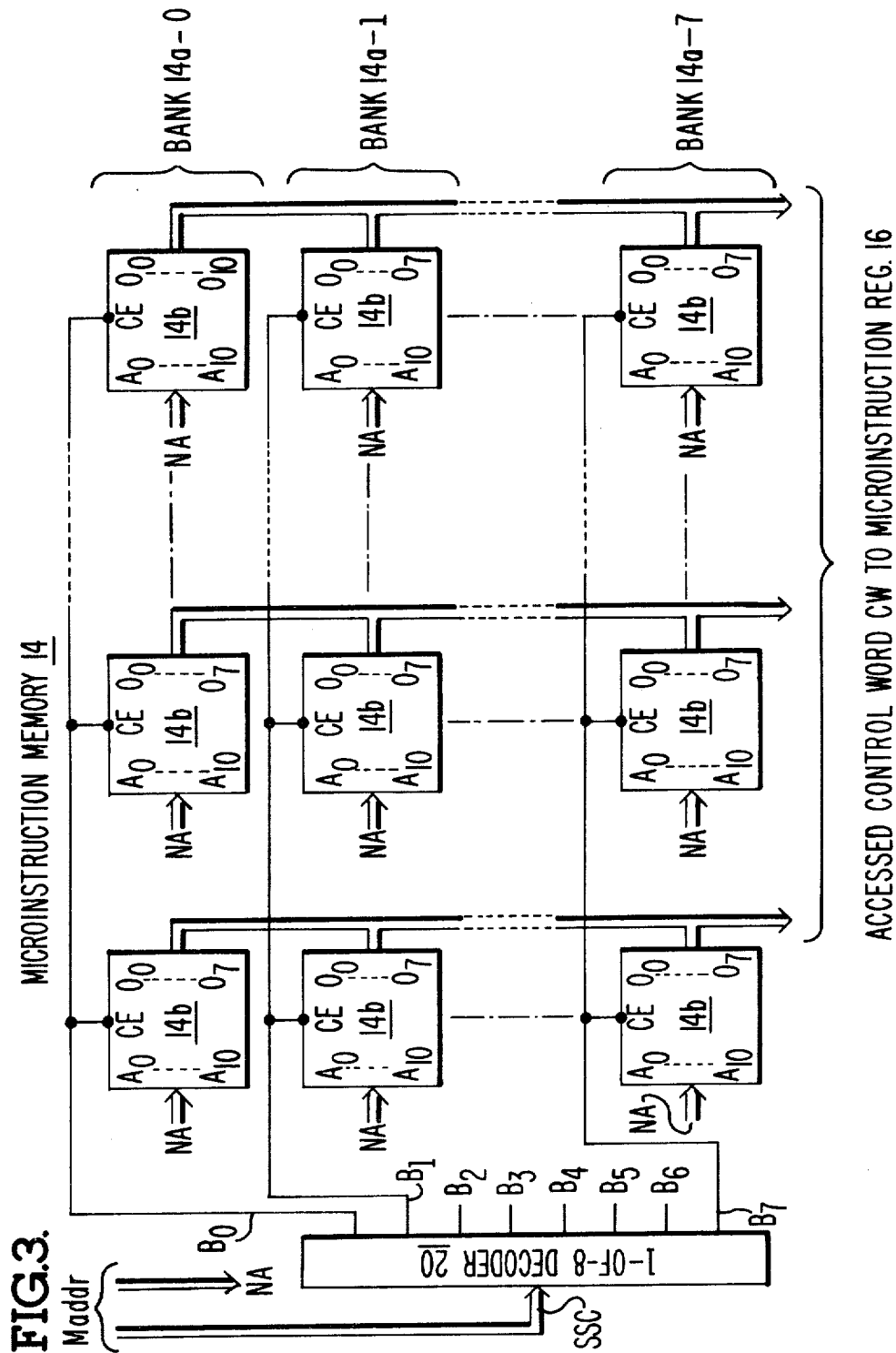
FIG. 3 is a block diagram illustrating a preferred implementation of the microinstruction memory of FIG. 1 in accordance with the invention.
Figure 4:
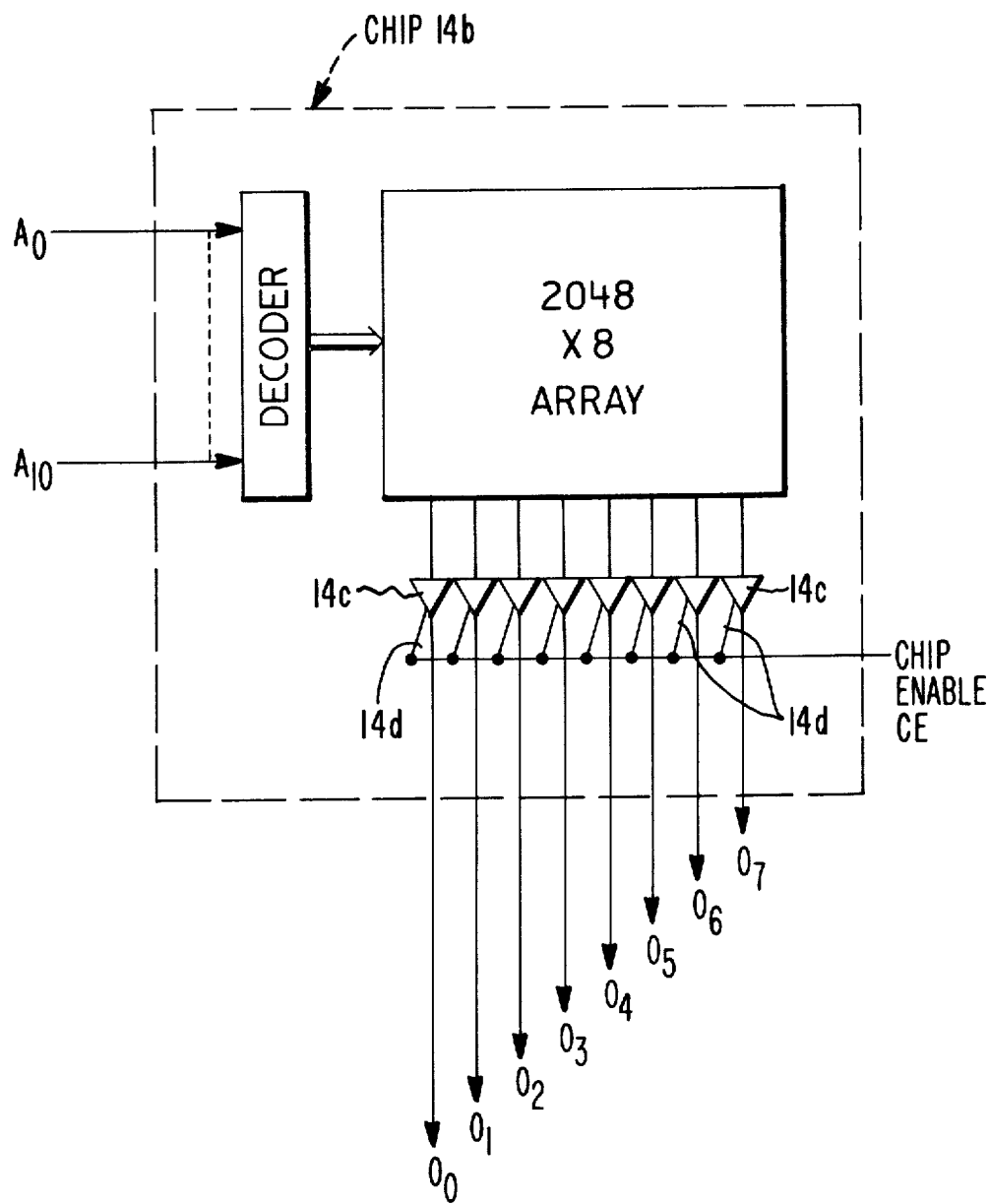
FIG. 4 is a preferred integrated circuit memory chip employed in the implementation of FIG. 3.

FIGS. 3 and 4 illustrate a preferred implementation of the microinstruction memory 14 of FIG. 1 which illustrates how significantly faster microinstruction execution can be achieved in accordance with the invention. As shown in FIG. 3, the microinstruction memory 14 includes a plurality of, for example, 8 banks 14a-0 to 14a-7 of integrated circuit memory chips 14b. Each bank 14a, for example, comprises 2048×80 bits formed from ten 2048×8 bit integrated circuit memory chips 14b. Each such 2048×8 bit integrated circuit memory chip 14b may, for example, be an Am27S291A read only integrated circuit memory chip available from Advanced Micro Devices, Inc., Sunnyvale, Calif.

FIG. 4 is a block diagram of a memory chip 14b of the general type represented by an Am27S291A memory chip. As shown in FIG. 4, address inputs $A_0$–$A_{10}$ are provided to permit addressing a selected 8-bit segment (byte) from the 2048×8 array of the chip 14b. The 8 bits of the selected byte are respectively applied to 8 output gates 14c which pass the selected byte to output lines $O_0$–$O_7$ only if these output gates 14c are enabled by applying a low or "0" binary signal to a chip enable input CE connected to the gate control inputs 14d.

Referring now to FIG. 3, along with FIG. 4, it is to be understood that the $A_0$–$A_{10}$ inputs shown for each chip 14b in FIG. 3 are the chip address inputs $A_0$–$A_{10}$ shown in FIG. 4, the CE input in FIG. 3 is the chip enable input CE shown in FIG. 4, and the $O_0$–$O_7$ outputs in FIG. 3 are the output lines $O_0$–$O_7$ in FIG. 4 on which the selected byte appears when CE is "1" or high.

As indicated in FIG. 3, the organization of the microinstruction memory 14 is such that the NA field portion of the next microinstruction control word address Maddr is applied to the $A_0$–$A_{10}$ inputs of every chip 14b, which for the exemplary memory shown in FIG. 3 is 80 chips. As also shown in FIG. 3, the SSC portion of Maddr, which comprises the three selected system conditions SSC provided by the system condition selector 18, are applied to a 1-of-8 decoder 20. The eight outputs $B_0$–$B_7$ of the 1-of-8 decoder 20 are respectively applied to the CE inputs of the chips 14b of each bank 14a so that the CE inputs of all of the ten chips 14b in each bank 14a receive the same respective output from the 1-of-8 decoder. Thus, the addressing of the microinstruction memory 14 in response to a next microinstruction control word address Maddr is such that the NA portion of Maddr selects a single one of the 2048 bytes in every chip 14b of the memory 14, while the 1-of-8 decoder 20 selects one of the 8 banks 14a-0 to 14a-7 in the memory. Output for the microinstruction memory 14 is provided by ORing together the chip $O_0$–$O_7$ outputs in each column. The resultant 80-bit memory ouput applied to the microinstruction register 16 (FIG. 1) is thus the concatenated outputs of the ten columns of chips 14b, wherein only the chip 14b of the selected bank is enabled in each column to provide the output for that column.

For example, assume that an applied address Maddr has the binary value 00000001100000 (which is 96) wherein NA is 00000001100 (which is 12) and SSC is 000 (which is 0). The 00000001100 value of NA applied to the $A_0$–$A_{10}$ inputs of every chip 14b in the microinstruction memory 14 will cause the #12 byte in each chip 14b to be accessed from the 2048×8 array in the chip and applied to the chip output gates 14c (see FIG. 4). The 000 value of SSC applied to the decoder 20 in FIG. 3 results in the decoder output $B_0$ becoming "0" or low, thereby causing a "0" to be applied to the CE input of each chip 14b in bank 14a-0 in FIG. 3. The resulting 80-bit microinstruction control word CW read out from the memory 14 into the microinstruction control register 16 will thus be the ten concatenated outputs $O_0$–$O_7$ of the ten chips in bank 14a-0 having values corresponding to the #12 byte in each chip 14b of bank 14a-0.

Before considering how the above described organization and accessing of the microinstruction memory 14 makes it possible to significantly increase the speed of microinstruction execution, it is important to realize that the manner of accessing provided by the memory organization illustrated in FIGS. 3 and 4 is not conventional. This will become evident by noting that consecutive address values for Maddr do not access consecutive addresses in a chip 14b and, in fact, do not even access a control word in the same bank 14a. For example, it will be remembered that the Maddr 00000001100000 (which is 96) used in the previous example accessed a control word CW corresponding to the ten concatenated #12 bytes of the ten chips 14b in bank 14a-0 in FIG. 3. If Maddr is incremented by 1 so as to now have the value 00000001100001 (which is 97), the accessed control word CW would not, as expected, be the next consecutive byte in each chip in bank 14a-0, which would be the ten concatenated #13 bytes of the ten chips 14b in bank 14a-0. Instead, the microinstruction control word CW accessed from the microinstruction memory 14 would be the ten concatenated #12 bytes in bank 14a-1 in FIG. 3.

Considering some other examples, it will be understood that Maddr decimal values of 0, 1, 2, 3, 4, 5, 6 and 7 will correspond to the ten concatenated #0 bytes located in banks 14a-0, 14a-1, 14a-2, 14a-3, 14a-4, 14a-5, 14a-6 and 14a-7, respectively, and that Maddr values of 8, 9, 10, 11, 12, 13, 14 and 15 will correspond to the ten concatenated #1 bytes located in banks 14a-0, 14a-1, 14a-2, 14a-3, 14a-4, 14a-5, 14a-6 and 14a-7, respectively, and so on. In other words, in order to select consecutive control words in a bank 14a in the implementation illustrated in FIGS. 3 and 4 which correspond to the ten concatenated bytes #0, #1, #2, #3, etc., the applied Maddr decimal values will have to be 0, 8, 16, 24, etc., respectively. Accordingly, it will be understood that the above described non-consecutive accessing provided for the microinstruction memory implementation illustrated in FIGS. 3 and 4 has to be taken into account when the memory is programmed so that the correct control words are accessed when the system operates.

Also, the memory 14 is organized so that the number of banks 14a provided is equal to the maximum number of N-way branches desired, which is determined by the number of outputs provided by the decoder 20. The number of decoder outputs is in turn determined by the number of conditions SSC provided by the system condition selector 20 in FIG. 1. Accordingly, if the number of decoder outputs is represented by $2^K$, the value of K will be equal to the number of selected conditions provided by SSC. Two selected conditions (K=2) will then require four decoder outputs and thus four banks 14a (4-way branch), three selected conditions (K=3) will require 8 decoder outputs and thus eight banks 14a (8-way branch as illustrated in FIG. 3), four selected conditions (K=4) will require 16 decoder outputs and thus 16 banks 14a (16-way branch), and so on.

It will be understood that the above described considerations regarding memory organization and accessing which arise when the particular memory implementation illustrated in FIGS. 3 and 4 is employed require greater care in organizing and programming the memory than for the conventional memory. However, where speed of microinstruction execution is an important consideration, the memory implementation illustrated in FIGS. 3 and 4 has the decided advantage of making it possible to achieve a significant increase in the speed of microinstruction execution, as will now be explained.

In order to explain how increased microinstruction execution is made possible, reference is again directed to FIG. 4 which is a block diagram of a chip 14b of a type suitable for use in accordance with the invention. The time required for a selected byte to be read out of the 2048×8 array in response to an address applied to the $A_0$–$A_{10}$ inputs is significantly greater than the time required to enable the chip in response to a "0" or low signal applied to the CE input of the chip which enables the chip output gates 14c. For example, the time required to select a byte from the chip array may typically be about 30 nanoseconds, while the time required to enable the chip may typically be about 10 nanoseconds.

In known microinstruction sequencing and branching approaches using a conventionally organized and accessed microinstruction memory, addressing of the chip array must wait until the complete microinstruction address becomes available. Thus, the time for fetching a next microinstruction includes the time required for selecting system conditions (to provide branching) as well as the time required for addressing the chip array. In accordance with the present invention, however, the previously described organization and accessing arrangement illustrated in FIGS. 3 and 4 for the microinstruction memory 14 makes it possible to begin accessing the chip array in FIG. 4 without delay. This is possible because, as described previously in connection with FIG. 3, the NA field which is applied to the chip address inputs $A_0$–$A_{10}$ in FIG. 4 is available in the microinstruction register 16 (FIGS. 1 and 2) at the start of the cycle. Thus, the time required for accessing the chip array can begin at the start of the cycle independently of system condition selection.

While the NA field in the microinstruction register 16 in FIG. 1 is selecting a corresponding byte in every chip 14b in FIG. 3, the accompanying CS field is applied to the system condition selector 18 for providing selected system conditions SSC to the 1-of-8 decoder 20 in FIG. 3, thereby causing a particular one of the outputs of the decoder 20 to become low or "0" to enable the corresponding chips 14b (via their CE inputs) in a selected one of the banks 14a. Thus, in the preferred implementation of the present invention the selection of a byte from the chip array in FIG. 4 in response to the NA field applied to the address inputs $A_0$–$A_{10}$ occurs in parallel and concurrently with the selecting of system conditions by the system condition selector 18 and the enabling of the chips 14b in a selected bank 14a by the decoder 20 in response to the selected system conditions SSC.

For example, the time required for accessing a byte from the chip array in response to an address applied to the chip address inputs $A_0$–$A_{10}$ in FIG. 4 may typically be 30 nanoseconds and the time required for selecting system conditions may typically be 15 nanoseconds. Thus, in a conventional system, the time required for selecting and fetching a next microinstruction in a branching situation is at least 45 nanoseconds. In the preferred implementation of the present invention, on the other hand, this figure drops to 30 nanoseconds (the time for accessing the chip array), since the time required for selecting conditions and enabling the chips of the selected bank using the decoder 20 is typically less than the chip array access time of 30 nanoseconds. For example, the 1-of-8 decoder 20 (which, for example, is implemented by a 74S138. Texas Instruments decoder integrated circuit chip) will typically add only about 10–14 nanoseconds to the typical condition select time of 15 nanoseconds.

Although the present invention has been described in connection with a particular preferred embodiment, it is to be understood that many modifications and variations in construction, arrangement and use are possible without departing from the spirit of the present invention. Accordingly, the present invention is to be considered as including all possible modifications and variations encompassed within the scope of the following claims.

What is claimed is:

1. In a microprogrammed data processing system having system condition signals indicating the states of particular portions thereof, the combination comprising:
   microinstruction memory means for storing selectively addressable microinstructions;
   means providing a microinstruction address for said microinstruction memory means, said microinstruction address being comprised of a next microinstruction address portion concatenated with one or more of said selected system condition signals, said one or more selected system conditions becoming available during operation of said system at a time later than said next microinstruction address portion;
   said microinstruction memory including a plurality of banks wherein each bank includes a plurality of selectively addressable integrated circuit memory chips each have a plurality of addressable inputs;
   each integrated circuit memory chip being constructed and arranged to have at least one fast response addressable input which has a faster response time than that of the other slower response addressable inputs of the chip; and
   means for accessing a microinstruction from said microinstruction memory means by applying said next microinstruction address portion to said slower response addressable inputs of the memory chips in a plurality of said banks, and by applying a bank selection signal to said at least one fast response addressable input of the circuit memory chips of a particular one of said banks, said bank selection signal being derived in response to said one or more selected system conditions.

2. The invention in accordance with claim 1, wherein said one or more selected system conditions constitute the least significant portion of said microinstruction address.

3. The invention in accordance with claim 1, wherein the number of banks provided in said microinstruction memory means is equal to $2^K$ where K is the number of said selected system conditions.

4. The invention in accordance with claim 3, wherein said means for accessing a microinstruction includes means for decoding said selected system conditions to provide an enabling signal to said slower response addressable inputs of the memory chips in a selected one of said banks.

5. The invention in accordance with claim 4, wherein said means for decoding provides a separate output corresponding to a respective bank of said microinstruction memory means which is applied as an enabling signal to all of the memory chips in its respective bank.

6. The invention in accordance with claim 1, 2, 3 or 4, wherein said microinstruction memory provides for storage of a next address field and a condition selection field for each stored microinstruction which fields are accessed along with their respective microinstruction, wherein said means providing a microinstruction address includes a microinstruction memory output means for storing an accessed microinstruction along with its respective next address and condition select fields, and wherein a system condition selecting means is provided responsive to said condition select field in said microinstruction memory output means for selecting said one or more selected system condition signals from those provided by said system.

7. The invention in accordance with claim 6, wherein the accessed output from said microinstruction memory means which is stored in said microinstruction memory output means is formed by concatenating the outputs of the selected memory chips in the selected bank.

8. The invention in accordance with claim 6, wherein said system operates over a plurality of successive cycles, wherein during each cycle said system executes a microinstruction accessed from said microinstruction memory during the previous cycle while concurrently accessing a next microinstruction from said microinstruction memory in response to a newly provided microinstruction.

9. In a microprogrammed data processing system, a method for increasing the speed of microinstruction branching, said method comprising:
providing a microinstruction along with corresponding next address data and condition select data;
applying said next address data to the address inputs of each of the integrated circuit memory chips of a multiple-chip microinstruction memory comprised of a plurality of banks wherein each bank contains a plurality of said integrated circuit memory chips, each chip being operative to access a selected segment stored in the chip in response to the applied next address data, the selected segment being outputed from the chip only when the chip is enabled; and
employing said condition select data concurrently with the applying of said next address data to each memory chip to select a plurality of system conditions indicative of one of a plurality of branches and then using these selected system conditions to selectively enable the chips in a corresponding one of said banks, the time required for enabling a chip being relatively short as compared to the time required for accessing a selected segment from the chip in response to the applied next address data.

10. The invention in accordance with claim 9, wherein the number of banks provided in said microinstruction memory is equal to the maximum number of branches.

11. The invention in accordance with claim 9 or 10, including the step of decoding said selected system conditions to produce a chip enabling signal which is applied to the chips of a selected one of said banks.

* * * * *

UNITED STATES PATENT AND TRADEMARK OFFICE
CERTIFICATE OF CORRECTION

PATENT NO. : 4,472,772

DATED : September 18, 1984

INVENTOR(S) : Laurence P. Flora

It is certified that error appears in the above-identified patent and that said Letters Patent is hereby corrected as shown below:

Col. 3, line 60, change "memory" to --register--.

*Signed and Sealed this*

*Twenty-sixth* Day of *February 1985*

[SEAL]

*Attest:*

DONALD J. QUIGG

*Attesting Officer*     *Acting Commissioner of Patents and Trademarks*